May 21, 1963 — L. J. KRODEL — 3,090,125
CYLINDER LINER BORE GAUGE
Filed Aug. 3, 1960 — 2 Sheets-Sheet 1

INVENTOR.
Leander J. Krodel
BY J. L. Carpenter
ATTORNEY

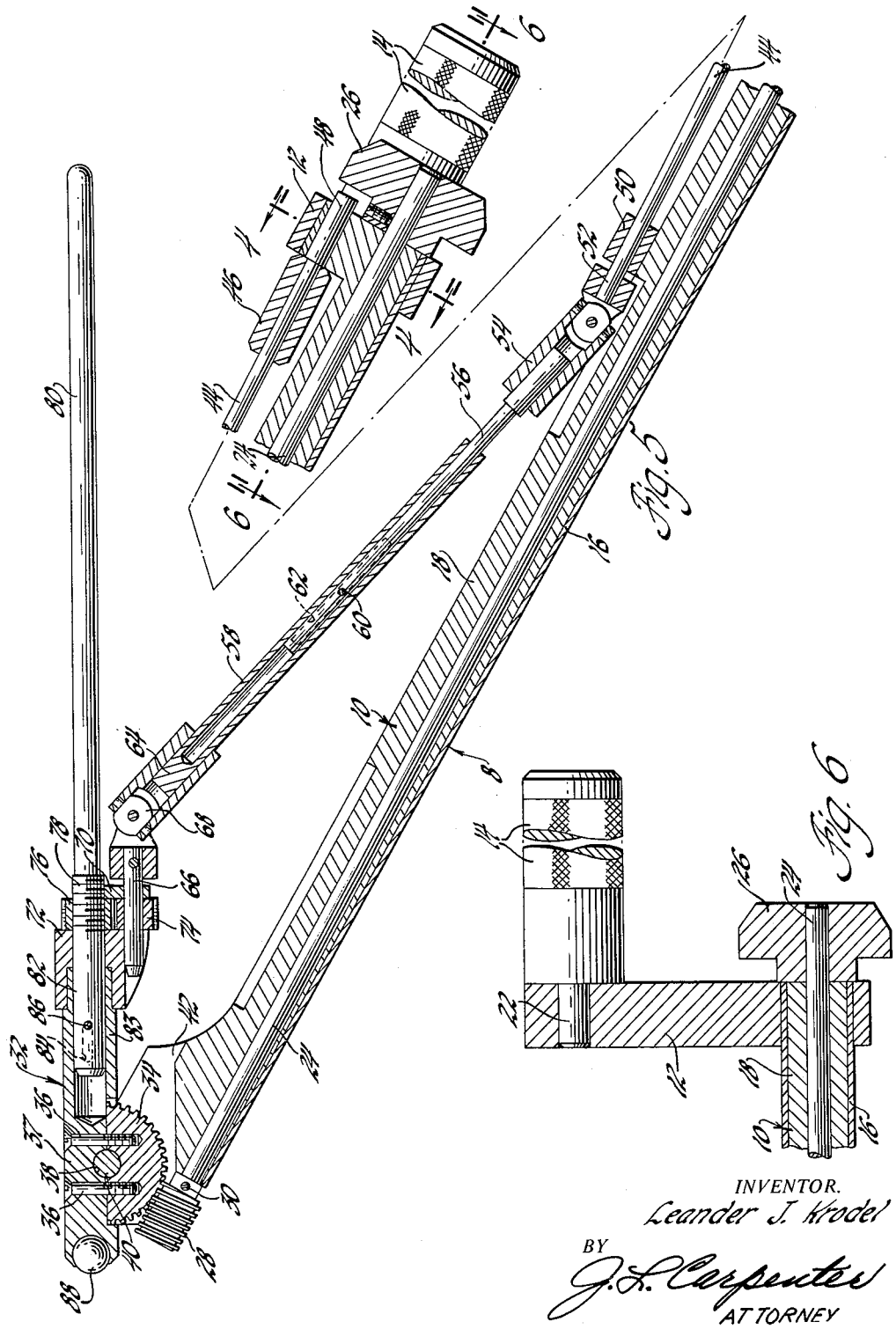

United States Patent Office 3,090,125
Patented May 21, 1963

3,090,125
CYLINDER LINER BORE GAUGE
Leander J. Krodel, Westmont, Ill., assignor to General Motors Corporation, Detroit, Mich., a corporation of Delaware
Filed Aug. 3, 1960, Ser. No. 47,262
2 Claims. (Cl. 33—143)

This invention relates generally to mechanical measuring devices and particularly to devices adapted to measure hollow interiors having limited access thereto. A prime example for which the measuring tool is particularly adapted is to measure or check the amount of cylinder liner wear which occurs in internal combustion engines such as diesel engines without the costly and time consuming removal of valve gear cylinder heads and other related equipment in order to gain access of the liner bore.

In the past, such time consuming effort was necessary with other types of existing gauges or measuring devices. In the present instance, a gauge or measuring tool has been designed so that it can be inserted into the engine cylinder liner through its nearest scavenging air intake port. An inside micrometer rod which is made an integral part of the measuring gauge or tool can then be positioned or raised to a suitable point near the top of the cylinder liner and the measurement taken. The tool, of course, is not limited to the construction shown. It may consist of any pivoted adjustable inside micrometer assembly, a means for positioning the micrometer assembly within the member to be measured or checked and any suitable frame or base to carry the measuring part of the tool. For a beter understanding of the invention and the objects thereof, reference may be made to the accompanying drawings in which:

FIGURE 5 is a complete assembly drawing of the tool with certain parts shown in section illustrating how the adjustable rod is to be connected to the base member of the tool and also how the rod may be adjusted.

FIGURE 6 is a further detail taken on the line 6—6 of the FIGURE 5 showing the handle and also one of the operating handles connected to one of the operating rods.

Figure 1:
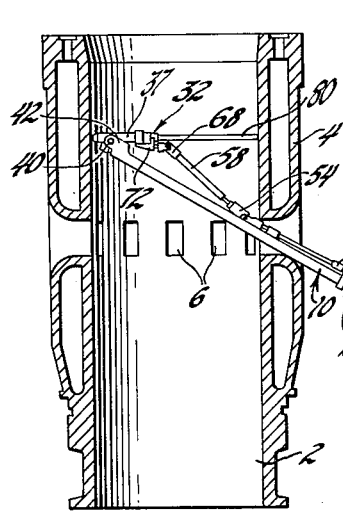
FIGURE 1 is a view in elevation of a section of an internal combustion engine cylinder liner having scavenging intake ports intermediate the ends thereof showing the novel measuring tool extending into one of the ports and measuring the wear or the size of the cylinder liner.
Figure 2:
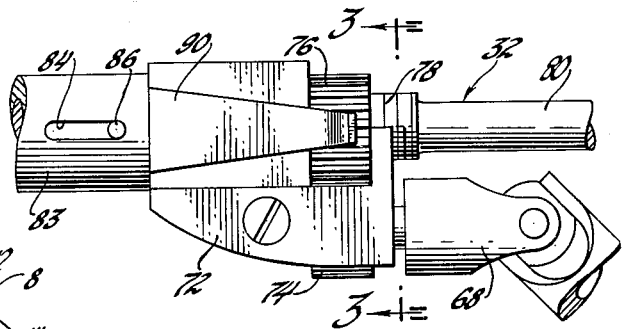
FIGURE 2 is an exterior view again in elevation greatly enlarged to show certain details of the adjustability of the measuring rod or micrometer assembly.
Figure 3:
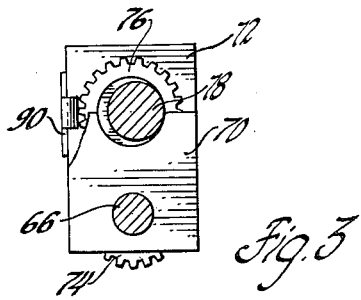
FIGURE 3 is a view taken substantially on the line 3—3 of the FIGURE 2 and shows how the external gear used to drive a threaded end of the rod assembly is braked by a leaf spring.

Referring now to the drawings, and particularly to FIGURE 1, an engine cylinder, particularly of the diesel type, is shown and indicated by the numeral 2. Located intermediate the ends of cylinder 2 and extending through the wall thereof as well as through the outer water jacket 4 are a plurality of circumferentially spaced openings comprising scavenging intake ports 6. A special measuring tool indicated generally by the numeral 8 and which forms the subject of this invention is shown inserted through one of the scavenging intake ports 6 and extended to measure the inside diameter of cylinder 2. It will be at once apparent that this tool, whose special construction enables this manner of measurement, eliminates dismantling a substantial part of the engine in order to have access for measurements in the conventional way.

Figure 4:
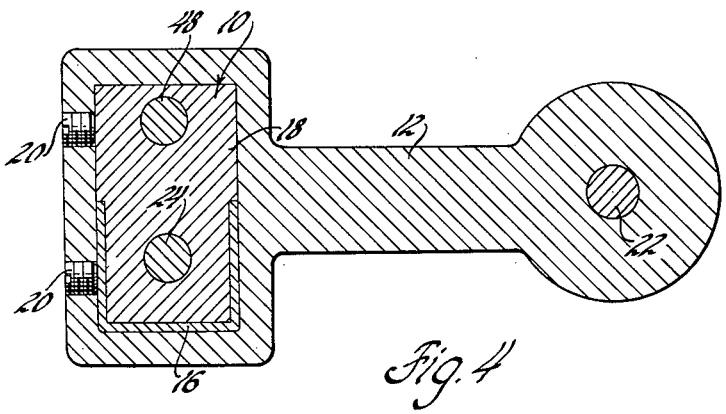
FIGURE 4 is a view taken on the line 4—4 of FIGURE 5 illustrating the handle for the measuring tool and also the manner in which the frame or base member of the assembly is secured to the handle and how it journals certain of the turning shafts for operating the tool.

Referring now to the remaining figures of the drawings, tool 8 will be described in detail. The measuring tool 8 includes an elongated base member 10 to which is fixed by an end bracket 12 a knurled handle 14. The base member 10 is made up of a channel-like member 16 which encases three sides of a bearing bar 18. The end bracket 12 has threaded therein (see FIGURE 4) a pair of set screws 20 which secure it to one end of base member 10. The handle 14 is provided with a stud 22 which is pressed into an end of the bracket 12 (again, see FIGURE 4).

The bearing bar 18 is bored to journal a raising rod or shaft 24. One end of shaft 24 extends through end bracket 12 and has secured thereto an operating knob or handle 26. The opposite end of shaft 24 is provided with a worm gear 28 which is fixed thereto by the set screw 30. It will be noted, especially in FIGURES 1 and 5, that the end of the base member 10, which includes the worm gear 28, is pivotally connected to an end of an adjustable micrometer rod assembly indicated generally by a numeral 32. The pivotal connection of base member 10 to adjustable rod assembly 32 includes a gear segment 34 which is fixed to one end of adjustable rod assembly 32 by studs 36. A hole is provided between the gear segment 34 and rod 37 which forms a cylindrical bearing surface 38 to journal a pin 40 extending through the flanged portions 42 provided on the pivoted base member 10. It will thus be seen that turning movement of the knurled knob 26 and shaft 24 will cause turning of the worm 28 on the gear segment 34 causing pivotal movement of the base member 10 with respect to the adjustable rod 32.

In order to adjust the length of the rod 32 so as to accurately measure the interior of a cylinder and like constructions having limited access thereto, a special driving train which includes a pair of universal joints and a telescoping connection along with a driving nut and a gear set is provided. This train has a shaft 44 to which is fixed a finger-operated sleeve or bushing 46. One end 48 of shaft 44 is journaled for rotation in end bracket 12 and the opposite end is journaled in a bearing block 50 fixed to the base member 10. An end 52 of shaft 44 is connected by a universal joint 54 to a shaft 56 which is telescoped in a hollow shaft 58 and keyed thereto by a pin 60 riding in a pair of slots 62 of shaft 58. An end 64 of hollow shaft 58 is connected to a stub shaft 66 by a second universal joint 68. Stub shaft 66 is journaled in a bearing bracket 70 and bearing block 72. Mounted for rotation between members 70 and 72 is a gear 74 which is in meshing engagement with an internally threaded gear 76. Gear 76 is turned on a threaded portion 78 of rod 80 forming the extensible portion of assembly 32. Rod 80 is provided with an end 82 extending into and telescoping with an end 83 of rod 37. Rod 37 has slots 84 in which rides a pin 86 fixed to rod 80. A ball point 88 is provided on the measuring end of rod 37. To prevent uncontrolled turning of gear 76 a spring brake 90 is provided.

In operation, the entire tool is collapsed so that rod assembly 32, base member 10, and the actuating shafts 24, 44, 56, 58, 66 are all substantially parallel. In this latter condition the tool 8 by its handle 14 may be inserted in one of the intake scavenging ports 6. By means of operating knob 26 acting on shaft 24 and worm and gear segment 28, 34 the adjustable micrometer rod assembly may be pivoted so that it extends diametrically in cylinder 2. The finger bushing 46 may then be turned to extend rod assembly 32 and thereby obtain the inner diameter of cylinder 2. Operating knob 26 is then turned to bring rod assembly 32 parallel with base member 10 so the whole assembly may be removed from cylinder 2. The length of rod assembly 32 may then be measured to determine the diameter of cylinder 2 or calibrations (not shown) can be provided on finger bushing 46 and bearing block 18 which will directly indicate the measurement.

I claim:

1. A measuring device comprising an elongated base member and an adjustable rod pivotally connected thereto, adjusting means to shorten and increase the length of said rod, means operable to move said rod relative to said member including a gear segment secured to one end of said rod and having its center located at the pivotal point of the pivotal connection between said rod and member and a worm gear meshing with said gear segment mounted on a shaft journaled in the length of said member, said shaft having an operating handle fixed thereto at the end of said shaft opposite said gear.

2. A measuring device comprising an elongated base member and an adjustable rod pivotally connected thereto, adjusting means to shorten and increase the length of said rod, means operable to move said rod relative to said member including a gear segment secured to one end of said rod and having its center located at the pivotal point of the pivotal connection between said rod and member and a worm gear meshing with said gear segment mounted on a shaft journaled in the length of said member, said shaft having an operating handle fixed thereto at the end of said shaft opposite said gear, and means to adjust the length of said rod comprising a rotary driving train adapted to extend generally along the length of said base member and including a finger-operated sleeve, a pinion having a driving shaft connected thereto, a pair of universal couplings and a telescoping solid and hollow shaft joint interposed between said couplings, one of said couplings connecting the train to said finger-operated sleeve and the other to said pinion driving shaft to drive said pinion, and a gear in meshing engagement with said pinion and which is internally threaded and has one end of said rod threaded therein.

References Cited in the file of this patent

UNITED STATES PATENTS

| | | |
|---|---|---|
| 2,466,916 | Stedman | Apr. 12, 1949 |
| 2,822,620 | Ulfeldt | Feb. 11, 1958 |